(12) United States Patent
Bayer et al.

(10) Patent No.: US 7,591,257 B2
(45) Date of Patent: Sep. 22, 2009

(54) FUEL SELECTION DEVICE

(75) Inventors: Don R. Bayer, Dousman, WI (US); Chris Turner, Whitewater, WI (US); Christine A. Richardson, Delavan, WI (US); Robert D. Kern, Waukesha, WI (US)

(73) Assignee: Generac Power Systems, Inc., Waukesha, WI (US)

( * ) Notice: Subject to any disclaimer, the term of this patent is extended or adjusted under 35 U.S.C. 154(b) by 374 days.

(21) Appl. No.: 11/516,981

(22) Filed: Sep. 7, 2006

(65) Prior Publication Data

US 2008/0060626 A1    Mar. 13, 2008

(51) Int. Cl.
*F02B 13/00* (2006.01)
(52) U.S. Cl. ...................... 123/575; 123/527
(58) Field of Classification Search ......... 123/575–578, 123/198 DB, 514, 516, 510, 27 GE, 1 A, 123/525, 526, 527–529; 137/255, 256, 113, 137/625.4, 627.5, 607
See application file for complete search history.

(56) References Cited

U.S. PATENT DOCUMENTS

| | | | | |
|---|---|---|---|---|
| 1,261,740 A | * | 4/1918 | Turner .................. | 123/575 |
| 2,911,958 A | * | 11/1959 | Griep .................. | 123/577 |
| 4,091,769 A | * | 5/1978 | Baldwin .................. | 123/1 A |
| 4,395,998 A | * | 8/1983 | Chou .................. | 123/575 |
| 4,683,864 A | * | 8/1987 | Bucci .................. | 123/575 |
| 6,035,837 A | * | 3/2000 | Cohen et al. ............ | 123/575 |
| 6,068,017 A | | 5/2000 | Haworth et al. | |
| 6,443,130 B1 | | 9/2002 | Turner et al. | |
| 6,863,034 B2 | | 3/2005 | Kern et al. | |

\* cited by examiner

*Primary Examiner*—Noah Kamen
(74) *Attorney, Agent, or Firm*—Boyle, Fredrickson, S.C.

(57) ABSTRACT

A fuel selection device is provided for allowing a user to connect the cylinders of an internal combustion engine to a user-selected fuel source. The fuel selection device includes a housing that defines a cavity for receiving a moveable selector therein. The selector defining first, second, third and fourth flow paths. The first and second flow paths are used for flowing a first type (e.g., natural gas) of fuel from a fuel source to the cylinders of the engine. The second and fourth flow paths are used for flowing a second type of fuel (e.g., liquid propane vapor) from a fuel source to the cylinder. The selector is movable between a first position wherein first and second cylinders communicate with the first and second flow paths, respectively, and a second position wherein the first and second cylinders communicate with the second flow path and fourth flow paths, respectively.

16 Claims, 3 Drawing Sheets

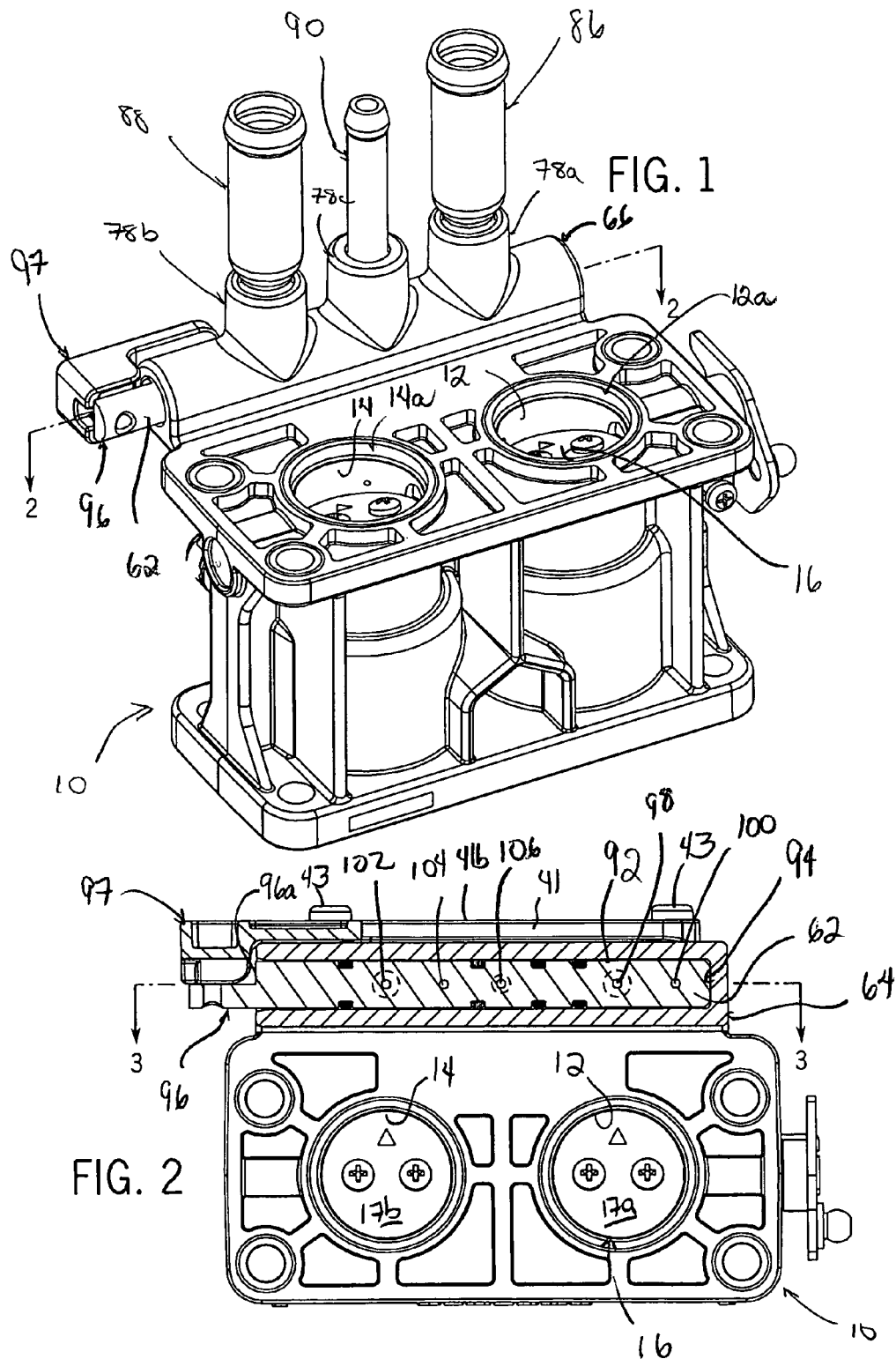

FUEL SELECTION DEVICE

FIELD OF THE INVENTION

This invention relates generally to internal combustion engines, and in particular, to a fuel selection device that allows a user to easily configure an internal combustion engine to receive the flow of one of a plurality of different fuels.

BACKGROUND AND SUMMARY OF THE INVENTION

As is known, internal combustion engines are utilized in a wide variety of applications, including stand-by electrical generators. It can be appreciated that the number of small internal combustion engines has risen dramatically over the past few years. As a result, state and federal regulators have begun to develop certain regulatory standards to insure that any air pollution generated by these types of engines is minimized.

One way to limit pollution, while simultaneously maximizing the efficiency of the engine, is to feed fuel to the engine within a predetermined range of rates. When an engine is fueled by a single liquid or gas fuel having a known, standard energy content per unit of fuel measure, e.g., British Thermal Units (BTU) per pound, it is a relatively straight forward process to configure a valve to flow fuel from a source to the engine at a particular rate. However, the task is significantly more complex when an engine has the ability to be fueled with either of two fuels, such as natural gas or liquefied propane vapor. More specifically, since the standard energy content of the two fuels is different, when fueling a small engine, it is necessary to be able to adjust the fuel flow rate in order to maximize the efficiency of the engine while maintaining the pollution generated by the engine below predetermined regulatory standards.

In order to adjust the fuel flow rate provided to the internal combustion engine, prior dual fuel valves have been developed. By way of example, Hayworth et al., U.S. Pat. No. 6,068,017 discloses a valve for flowing gaseous fuel, such as natural gas or propane vapor, to an internal combustion engine. The valve includes a valve body having an inlet passage, and first and second outlet passages in full communication with the inlet passage. A plug-type adjustment member is threaded into the body and an annular seat in the body co-acts with the adjustment member to form an orifice in the first outlet path. A stop mechanism limits movement of the adjustment member between a first position in which the orifice is smaller than a second position in which the orifice is larger. The valve permits the adjustment of the fuel flow to small engines so that such engines provide maximum power without exceeding applicable admission standards.

While functional for its intended purpose, the process for converting the valve between the dual fuels is a manual process and is somewhat time consuming. More specifically, the use of the dual fuel valve disclosed in the '017 patent requires the repositioning of hoses, the threading of a jet or orifice device into or out of the valve body, regulation of the jet and additional adjustments. Consequently, it is highly desirable to provide a fuel selection device that is simple to utilize and more user friendly than prior dual fuel valves.

It is a primary object and feature of the present invention to provide a fuel selection device that allows a user to configure the internal combustion engine to receive the flow of one of a plurality of different fuels.

It is a further object and feature of the present invention to provide a fuel selection device that allows a user to configure the internal combustion engine to receive the flow of one of a plurality of different fuels within predetermined standards.

It is a still further object and feature of the present invention to provide a fuel selection device that allows a user to configure the internal combustion engine to receive the flow of one of a plurality of different fuels and that is simple to use.

In accordance with the present invention, a fuel selection device is provided for allowing a user to select a flow path for fuel to be provided to an engine. The fuel selection device includes a first input conduit having a first end connectable to a user selected fuel source for receiving fuel therefrom and a second end. A selector switch has an input communicating with the second end of the first input conduit and an output. The selector switch is movable between a first position wherein the input and output of the selector switch communicate through a first flow path and a second position wherein the input and output of the selector switch communicate through a second flow path.

The selector switch includes a housing having a movable selector therein. The selector defines the first and second flow paths. The selector extends along a longitudinal axis and is axially movable between the first and second positions. It is contemplated for the fuel selection device to include a second input conduit having a first end connectable to the user selected fuel source for receiving fuel therefrom and a second end. The selector switch includes a second input communicating with the second end of the second input conduit and a second output. In addition, the selector switch includes third and fourth flow paths. The second input and the second output of the selector switch communicate through the third flow path with the selector switch in the first position. In addition, the second input and the second output of the selector switch communicate through the fourth flow path with the selector switch in the second position. The first flow path is generally cylindrical and has a diameter. Similarly, the second flow path is generally cylindrical and has a diameter. The diameter of the first flow path being different than the diameter of the second flow path.

In accordance with a further aspect of the present invention, an improvement in a engine fueled by a plurality of fuels is provided. The engine has first and second cylinders. The improvement includes a selection device having first and second inputs operatively connected to a fuel source. A first output is operatively connectable to the first cylinder of the engine. A second output is operatively connectable to the second cylinder of the engine. The selection device is movable between first and second positions. In the first position, the first input and the first output of the selection device communicate through a first flow path, and the second input and the second output of the selection device communicate through a second flow path. In the second position, the first input and the first output of the selection device communicate through a third flow path, and the second input and the second output of the selection device communicate through a fourth flow path The selection device includes a housing extending along an axis. The housing has an inner surface defining a cavity therein. A movable selector is positioned within the cavity in the housing. The selector defines the first, second, third and fourth flow paths. The selector extends along the axis and is axially movable between the first and second positions. The housing defines a first closed end of the cavity and a second open end. The selector includes first and second opposite ends. The first end of the selector engages the closed end of the cavity with the selector in the first position. A stop may be interconnected to the housing. The second end of the selector may include a shoulder formed therein that engages the stop with the selector in the second position.

The improvement may also include first and second input conduits. The first input conduit has a first end connectable to the user selected fuel source for receiving fuel therefrom and a second end operatively connected to the first input. The second input conduit has a first end connectable to the user selected fuel source for receiving fuel therefrom and a second end operatively connected to the second input.

The selection device may also include a third input and a third output. The third input communicates with the third output through a fifth flow path with the selection device in the first position. Alternatively, the third input is isolated from the third output with the selection device in the second position.

In accordance with a still further aspect of the present invention, a fuel selection device is provided for allowing a user to connect a first cylinder of an engine to a user-selected fuel source. The fuel selection device includes a housing defining a cavity and a selector receivable in the cavity. The selector defines first and second flow paths. In addition, the selector is movable between a first position wherein the first cylinder communicates with the first flow path and a second position wherein the first cylinder communicates with the second flow path.

The housing includes a first input connectable to the fuel source and a first output operatively connectable to the first cylinder. The first input and the first output communicate with the first flow path with the selector in the first position and communicate with the second flow path with the selector in the second position. The housing also includes an inner surface that defines the cavity and the selector includes an outer surface that forms a slidable interface with the inner surface of the housing. A first seal extends about the outer surface of the selector between the first flow path and an end of the selector. The fuel selection device may also include first and second stops. The selector engages the first stop with the selector in the first position and the selector engages the second stop with the selector in the second position.

BRIEF DESCRIPTION OF THE DRAWINGS

The drawings furnished herewith illustrate a preferred methodology of the present invention in which the above advantages and features are clearly disclosed as well as others which will be readily understood from the following description of the illustrated embodiment.

In the drawings:

FIG. 1 is an isometric view of a throttle body for an internal combustion engine incorporating the fuel selection device of the present invention;

FIG. 2 is a cross sectional view of the throttle body taken along line 2-2 of FIG. 1;

DETAILED DESCRIPTION OF THE DRAWINGS

Figure 3:
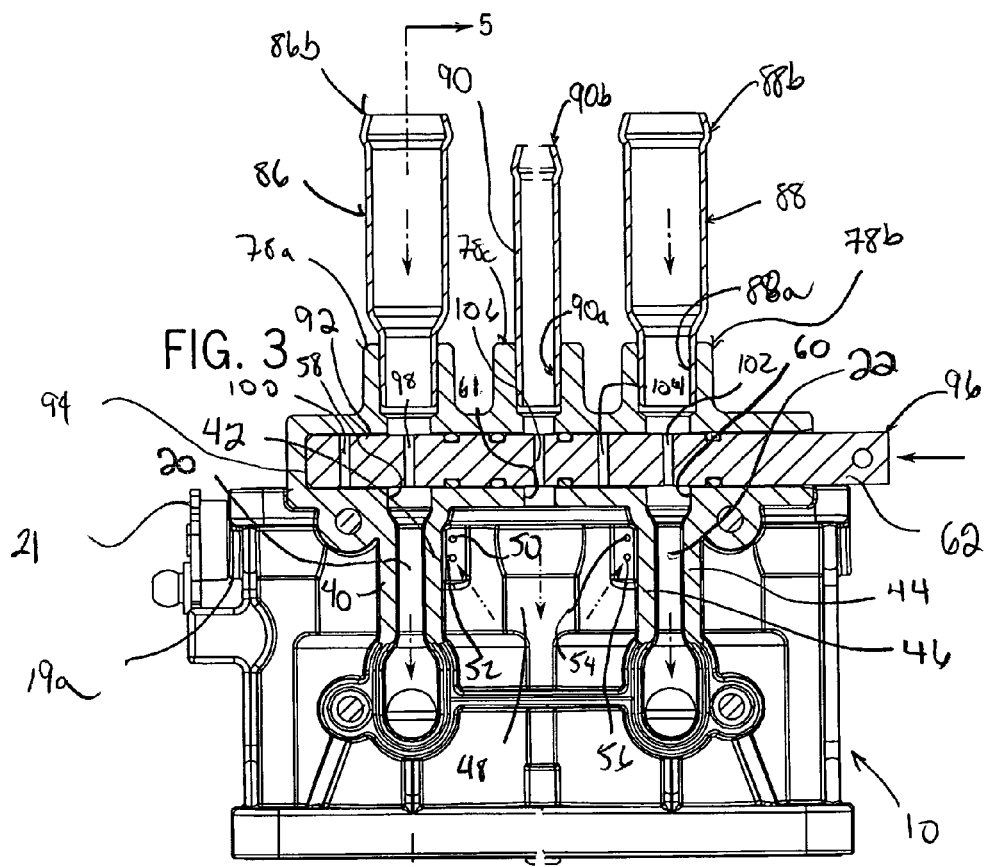
FIG. 3 is a cross sectional view of the throttle body taken along line 3-3 of FIG. 2 showing the fuel selection device in a first position.

Referring to FIG. 1, a throttle body incorporating the fuel selection device of the present invention is generally designated by the reference numeral 10. As is conventional, throttle body 10 defines first and second generally cylindrical passageways 12 and 14 therethrough. Passageways 12 and 14 include input ends operatively connected to output of an air intake and output ends 12a and 14a, respectively, communicating with corresponding cylinders of an internal combustion engine via an intake manifold, not shown.

As best seen in FIGS. 1-2, butterfly valve 16 may be disposed in passageways 12 and 14 through throttle body 10 to independently control the flow of the air/fuel mixture therethrough. Butterfly valve 16 includes circular valve elements 17a and 17b received in corresponding passageways 12 and 14, respectively, and interconnected by shaft 19, FIG. 5. Shaft 19 extends through throttle body 10, including passageways 12 and 14, along an axis generally perpendicular to the axes of passageways 12 and 14. Throttle plate 21 is interconnected to first end 19a of shaft 19 and to an actuator (not shown), FIG. 3. As is conventional, the actuator controls the pivotable movement of butterfly valve 16 between an open or full throttle position and a closed position, FIGS. 1-2.

Figure 6:
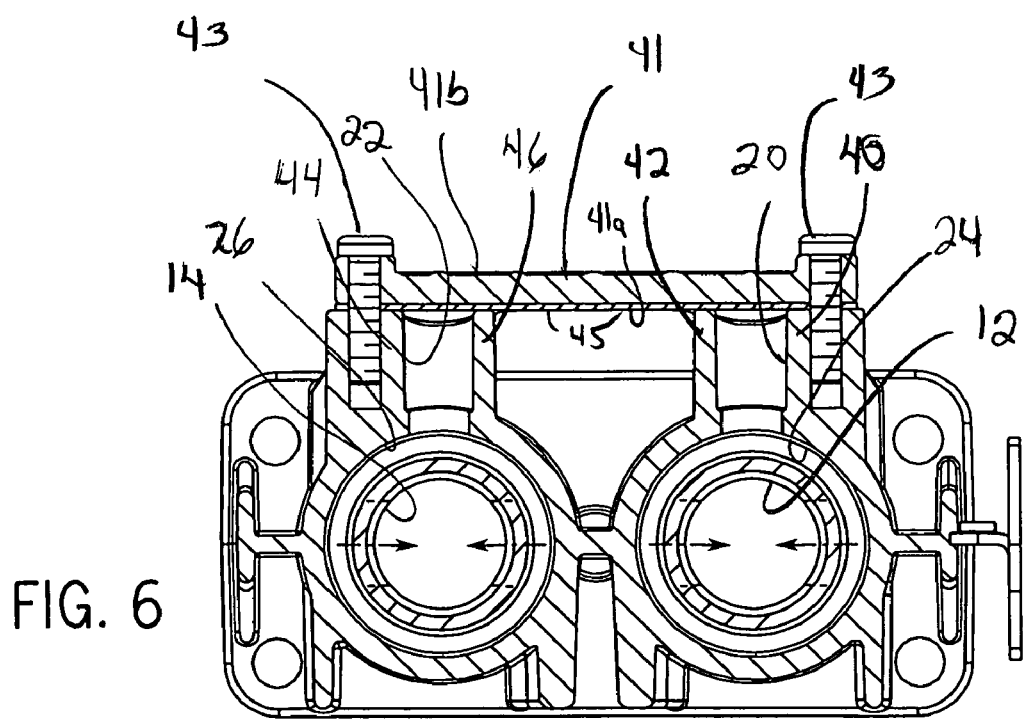
FIG. 6 is a cross sectional view of the throttle body taken along line 6-6 of FIG. 5.

Throttle body 10 further defines first and second fuel chambers 20 and 22, respectively. As best seen in FIG. 6, fuel chamber 20 communicates with first passageway 12 through flow path 24. Similarly, second fuel chamber 22 communicates with second passageway 14 through flow path 26. Fuel chambers 20 and 22 are identical in structure and as such, the description hereinafter of fuel chamber 20 is understood to describe fuel chamber 22 as if fully described herein.

Figure 5:
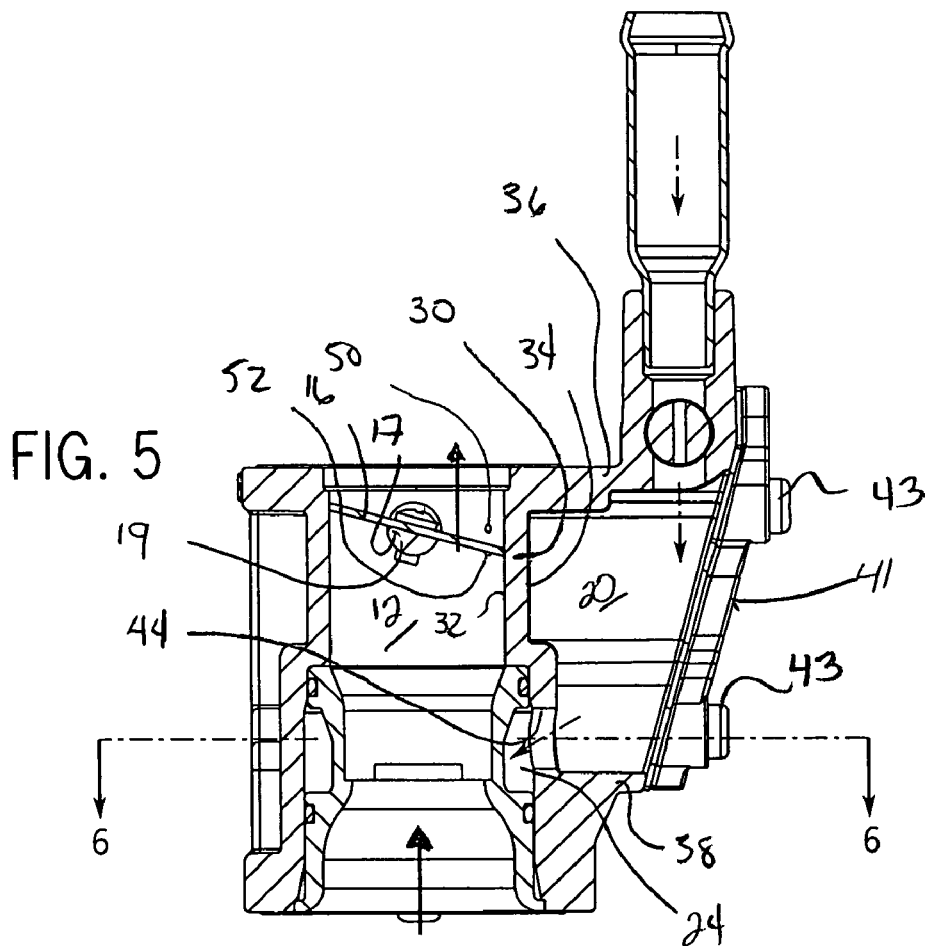
FIG. 5 is a cross sectional view of the throttle body taken along line 5-5 of FIG. 3.

Referring to FIG. 5, throttle body 10 includes inner wall 30 having an inner surface 32 partially defining passageway 12 and outer surface 34 directed toward fuel chamber 20. Upper and lower walls 36 and 38 extend laterally from outer surface 34 of inner wall 30 and are spaced from each other so as to partially define fuel chamber 20. Upper and lower walls 36 and 38 separated by first and second sidewalls 40 and 42, respectively, FIG. 6. Opening 44 is provided in inner wall 30 for allowing fuel chamber 20 to communicate with flow path 24. As best seen in FIGS. 5-6, seal plate 41 is interconnected to throttle body 10 by a plurality of bolts 43. Gasket 45 is position against inner surface 41a of seal plate 41 to isolate fuel chambers 20 and 22 and fuel injection chamber 48 from the environment external to throttle body 10.

Figure 4:
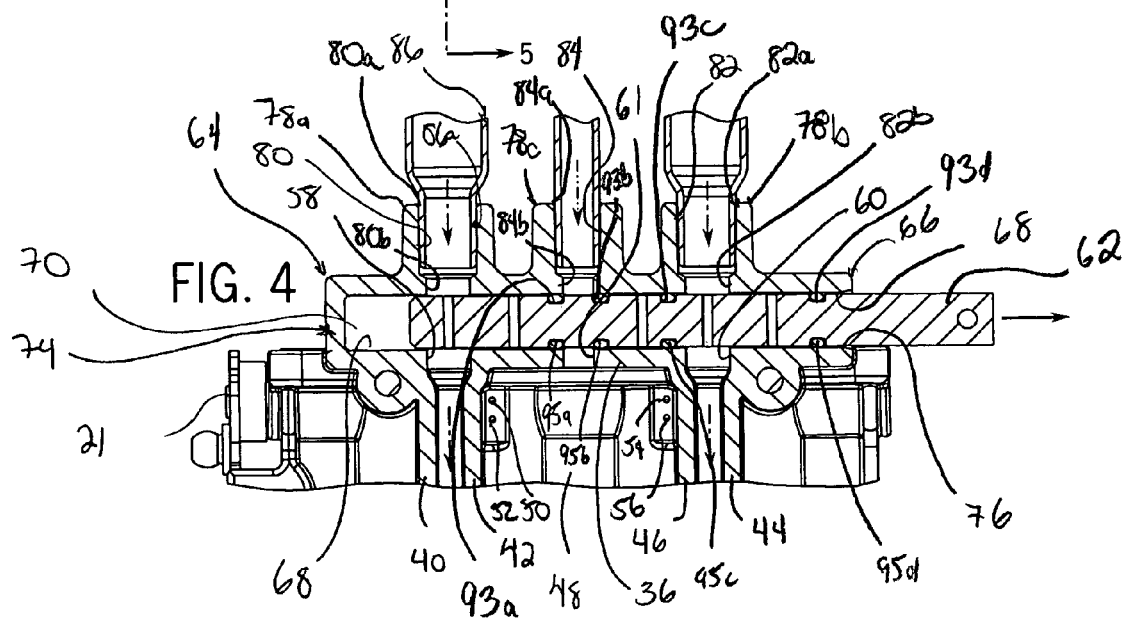
FIG. 4 is an enlarged, cross sectional view of the throttle body, similar to FIG. 3, showing the fuel selection device in a second position.

Similar to fuel chamber 20, chamber 22 is partially defined by spaced sidewalls 44 and 46, respectively, FIGS. 3-4 and 6. Sidewalls 42 and 46 in throttle body 10 define fuel injection chamber 48 therebetween. Progression holes 50 and 52 allow fuel injection chamber 48 to communicate with passageway 12 through throttle body 10. Similarly, progression holes 54 and 56 allow fuel injection chamber 48 to communicate with second passageway 14 through throttle body 10. As is known, it is contemplated to vary the dimensions of progression holes 50, 52, 54 and 56 to control the amount of fuel flowing into passageways 12 and 14, for reasons hereinafter described.

Referring back to FIGS. 3-4, upper wall 36 of throttle body 10 includes opening 58 in communication with chamber 20, a second opening 60 in communication with fuel chamber 22, and a third opening 61 in communication with fuel injection chamber 48. As hereinafter described, first, second and third openings 58, 60 and 61 define outputs for fuel selector housing 64, as hereinafter described. Fuel selector housing 64 further includes a first generally cylindrical portion 66 having a generally cylindrical inner surface 68 defining cavity 70 therein for receiving fuel selector 62. Cavity 70 extends along a longitudinal axis. Fuel selector housing 64 includes a first closed end 74 that defines a first stop for fuel selector 62 and a second open end 76 for allowing fuel selector 62 to be inserted into and slid from cavity 70 in fuel selector housing 64.

Fuel selector housing 64 further includes generally cylindrical input conduits 78a-78c projecting from cylindrical portion 66 thereof. Input conduit 78a includes a central passageway 80 extending therethrough. Passageway 80 through input conduit 78a is axially aligned with opening 58 through upper wall 36 of throttle body 10 and includes a first outer end 80a and a second inner end 80b that communicates with cavity 70 defined by cylindrical portion 66 of fuel selector housing 64. Second input conduit 78b includes a central passageway 82 therethrough having a first end 82a and a second end 82b communicating with cavity 70 within cylindrical portion 66 of fuel selector housing 64. It is intended that passageway 82 through second input conduit 78b be axially aligned with second opening 60 through upper wall 36 in throttle body 10. The third input conduit 78c also includes a central passageway 84 having a first end 84a and a second end 84b communicating with cavity 70 in cylindrical portion 66 in fuel selector housing 64. Passageway 84 is axially aligned with third opening 61 through upper wall 36 in throttle body 10.

As best seen in FIG. 3-4, first end 80a of passageway 80 through input conduit 78a is adapted for receiving a first end 86a of first fuel tube 86. Second end 86b of fuel input tube 86 communicates with a first outlet of a fuel demand regulator through a conventional hose. First end 82a of passageway 82 through second input conduit 78b is adapted for receiving first end 88a of a second fuel input tube 88. Second end 88b of fuel input tube 88 communicates with a second outlet of a fuel demand regulator through a conventional hose. Finally, first end 84a of passageway 84 through third input conduits 78c is adapted for receiving a first end 90a of fuel injection tube 90. Second end 90b of fuel injection tube 90 communicates with a fuel demand regulator or with a constant fuel source through a conventional hose. A conventional fuel demand regulator is fully described in U.S. Pat. No. 6,443,130, entitled "Fuel Demand Regulator" assigned to the assignee to the present invention and incorporated herein by reference.

Fuel selector 62 is generally cylindrical in shape and includes outer surface 92, inner end 94 and outer end 96. Outer end 96 of fuel selector 62 includes shoulder 96a formed therein. It is intended that shoulder 96a engage second stop 97, FIG. 2, interconnected to seal plate 41 with fuel selector 62 in a second position, FIG. 4, as hereinafter described. A plurality of axially spaced grooves 93a-93d are provided in outer surface 92 of fuel selector 62. Grooves 93a-93d are adapted for receiving corresponding o-rings 95a-95d, respectively, therein. O-rings 95a-95d prevent the flow of fuel from cavity 70 in cylindrical portion 66 of fuel selector housing 64 along the outer surface 92 of fuel selector.

Referring to FIGS. 3-4, fuel selector 62 includes first and second passageways 98 and 100, respectively, for transferring fuel received by input conduit 78a to fuel chamber 20 within throttle body 10. First and second passageways 98 and 100, respectively, have different diameters and are axially spaced from each other by a predetermined distance, for reasons hereinafter described. Fuel selector 62 further includes third and fourth passageways 102 and 104, respectively, for transferring fuels received at second input conduit 78b to second fuel chamber 22 within throttle body 10. Third and fourth passageways 102 and 104, respectively, have different diameters and are also axially spaced from each other by the predetermined distance, for reasons hereinafter described. Finally, fuel selector includes a fifth passageway 106 that allows fuel received at input conduit 78c to be transferred to fuel injection chamber 48 within throttle body 10.

Fuel selector 62 is movable along the longitudinal axis of cavity 70 between a first position wherein inner end 94 of fuel selector 62 engages the first stop defined by closed end 74 of fuel selector housing 64 and a second position wherein shoulder 96a engages second stop 97 mounted to outer surface 41b of seal plate 41. It is contemplated for the axial distance traveled by fuel selector 62 between the first and second positions to be generally equal to the distance between first and second passageways 98 and 100, respectively, and the distance between third and fourth passageways 102 and 104, respectively. With fuel selector in the first position, passageway 80 through first input conduit 78 communicates with fuel chamber 20 within throttle body 10 through first passageway 98; passageway 82 through second input conduit 78b communicates with second fuel chamber 22 in throttle body 10 through third passageway 102; and passageway 84 through third conduit 78c communicates with fuel injection chamber 48 through fifth passageway 106; and second position, FIG. 4, wherein passageway 80 through first conduit 78a communicates with fuel chamber 20 in throttle body 10 through second passageway 100; passageway 82 through second conduit 78b communicates with fuel chamber 22 in throttle body 10 through fourth passageway 104; and passageway 84 through third input conduit 78c is isolated from fuel injection chamber 48.

In operation, fuel selector 62 is moved to a user selected one of the first and second positions described above corresponding to the type of fuel to which it is intended the engine to run. By way of example, in the first position, fuel selector 62 is configured to flow natural gas from a first user selected source to the cylinders of an engine at a particular rate through first and third passageways 98 and 102, respectively. In the second position, fuel selector 62 is configured to flow liquefied propane vapor from a second user selected source to the cylinders of the engine at a particular rate through second and fourth passageway 100 and 104, respectively. When the engine is started, a vacuum is generated by each cylinder of the engine to draw fuel from the fuel demand regulator that, in turn, is connected to the user selected fuel source. With the fuel selector in the first position, FIG. 3, natural gas is drawn into fuel chamber 20 in throttle body 10 through first passageway 98 in fuel selector 62 and into fuel chamber 22 in throttle body 10 through third passageway 102 in fuel selector 62. The natural gas in fuel chambers 20 and 22 is drawn by the vacuum into passageways 12 and 14, respectively, and mixes with air received in passageways 12 and 14 from the air intake through corresponding inputs of passageways 12 and 14, respectively.

The fuel mixture exits the passageways 12 and 14 in throttle body 10 through corresponding outputs 12a and 14a, respectively, into corresponding combustion chambers in corresponding cylinders on the first sides of the pistons of the internal combustion engine via the intake manifold. The fuel mixture in the chambers are ignited so as to cause linear motion on the pistons within the corresponding cylinders. The linear motion of the pistons is converted into a rotational motion by a crankshaft.

In order to balance the natural gas in the fuel mixture provided to each cylinder of the internal combustion engine, natural gas maybe added directly to the fuel mixture in passageways 12 and 14 through throttle body 10. As described, with fuel selector 62 in the first position, the natural gas within third input conduit 78c flows into fuel injection chamber 48 through fifth passageway 106, through progression holes 50 and 52 into passageway 12, and through progression holes 54 and 56 into passageway 14. The dimensions of progression holes 50, 52, 54 and 56 may be modified to insure the optimum volume of fuel is provided to both fuel mixtures during all operating conditions of the internal combustion engine, including the starting and idling of the same.

Alternatively, in order to operate the internal combustion engine on liquefied propane vapor, the engine is operatively connect to a user selected source and fuel selector 62 is moved to the second position such that shoulder 96a engages second stop 97 mounted to outer surface 41b of seal plate 41. With fuel selector 62 in its second position, FIG. 4, passageway 80 through first input conduit 78a communicates with fuel chamber 20 in throttle body 10 through second passageway 100 and passageway 82 through second input conduit 78b communicates with second chamber 22 in throttle body 10 through fourth passageway 104. Fuel injection chamber 48 communicates with passageway 84 through third input conduit 78c by the clearance between fuel selector 62 and inner surface 68 of fuel selector housing 64. As such, when the internal combustion engine has started, the vacuum generated by cylinder of the engine draws the liquefied propane vapor through passageways 100 and 104 through fuel selector 62 into fuel chambers 20 and 22, respectively, in throttle body 10. The liquefied propane vapor in fuel chambers 20 and 22 is drawn into passageways 12 and 14, respectively, in throttle body 10 wherein the fuel mixes with the air received from the air intake.

The fuel mixture exits the passageways 12 and 14 in throttle body 10 into corresponding combustion chambers in corresponding cylinders on the first sides of the pistons of the internal combustion engine via the intake manifold. The fuel mixture in the chambers are ignited so as to cause linear motion on the pistons within the corresponding cylinders. The linear motion of the pistons is converted into a rotational motion by a crankshaft. It can be appreciated that liquefied propane vapor has a known, standard energy content per unit of fuel measured.

Various modes of carrying out the invention are contemplated as being within the scope of the following claims particularly pointing out and distinctly claiming the subject matter that is regarded as the invention.

We claim:

1. A fuel selection device for allowing a user to select a flow path for fuel to be provided to an engine, comprising:
    a first input conduit having a first end connectable to a user selected fuel source for receiving fuel therefrom and a second end;
    a selector switch having an input communicating with the second end of the first input conduit and an output, the selector switch movable between a first position wherein the input and the output of the selector switch communicate through a first flow path and a second position wherein the input and the output of the selector switch communicate through a second flow path;
    a second input conduit having a first end connectable to the user selected fuel source for receiving fuel therefrom and a second end;
    wherein the selector switch includes:
        a second input communicating with the second end of the second input conduit and a second output; and
        third and fourth flow paths, wherein the second input and second output of the selector switch communicate through the third flow path with the selector switch in the first position and the second input and second output of the selector switch communicating through the fourth flow path with the selector switch in the second position.

2. The fuel selection device of claim 1 wherein the selector switch includes a housing having a movable selector therein, the selector defining the first and second flow paths.

3. The fuel selection device of claim 2 wherein the selector extends along a longitudinal axis and wherein the selector is axially movable between the first and second positions.

4. In a engine fueled by a plurality of fuels, the engine having first and second cylinders, the improvement comprising:
    a selection device having first and second inputs operatively connected to a fuel source, a first output operatively connected to the first cylinder of the engine, and a second output operatively connected to the second cylinder of the engine, the selection device movable between:
    a first position wherein the first input and the first output of the selection device communicate through a first flow path and wherein the second input and the second output of the selection device communicate through a second flow path; and
    a second position wherein the first input and the first output of the selection device communicate through a third flow path and wherein the second input and the second output of the selection device communicate through a fourth flow path.

5. The improvement of claim 4 wherein the selection device includes:
    a housing extending along an axis and having an inner surface defining a cavity therein;
    a movable selector positioned within the cavity in the housing, the selector defining the first, second, third and fourth flow paths.

6. The improvement of claim 5 wherein the selector extends along the axis and wherein the selector is axially movable between the first and second positions.

7. The improvement of claim 5 wherein the housing defines a first closed end of the cavity and a second open and wherein the selector includes first and second opposite ends, the first end of the selector engaging the closed end of the cavity with the selector in the first position.

8. The improvement of claim 7 further comprising a stop interconnected to the housing and wherein the second end of the selector includes a shoulder formed therein, the shoulder engaging the stop with the selector in the second position.

9. The improvement of claim 4 further comprising:
    a first input conduit having a first end connectable to the user selected fuel source for receiving fuel therefrom and a second end operatively connected to the first input;
    a second input conduit having a first end connectable to the user selected fuel source for receiving fuel therefrom and a second end operatively connected to the second input.

10. The improvement of claim 4 wherein the selection device includes a third input and a third output, the third input communicating with the third output through a fifth flow path with the selection device in the first position.

11. A fuel selection device for allowing a user to connect a first and second cylinders of an engine to a user-selected fuel source, comprising:
    a housing defining a cavity; and
    a selector receivable in the cavity and defining first, second, third and fourth flow paths, the selector movable between:

a first position wherein first cylinder communicates with the first flow path and the second cylinder communicates with the third flow path; and a second position wherein the first cylinder communicates with the second flow path and the second cylinder communicates with the fourth flow path.

12. The fuel selection device of claim 11 wherein the housing includes a first input connectable to the fuel source and a first output operatively connected to the first cylinder, the first input and the first output communicating with the first flow path with the selector in the first position and communicating with the second flow path with the selector in the second position.

13. The fuel selection device of claim 11 wherein the housing includes an inner surface defining the cavity and wherein the selector includes an outer surface that forms a slidable interface with the inner surface of the housing.

14. The fuel selection device of claim 13 wherein the selector includes a first end and a second end and wherein the fuel selection device includes a first seal extending about the outer surface of the selector between the first flow path and second end of the selector.

15. The fuel selection device of claim 11 further comprising first and second stops, the selector engaging the first stop with the selector in the first position and the selector engaging the second stop with the selector in the second position.

16. A fuel selection device for allowing a user to select a flow path for fuel to be provided to an engine, comprising:

a first input conduit having a first end connectable to a user selected fuel source for receiving fuel therefrom and a second end; and a selector switch having an input communicating with the second end of the first input conduit and an output, the selector switch movable between a first position wherein the input and the output of the selector switch communicate through a first flow path and a second position wherein the input and the output of the selector switch communicate through a second flow path;

wherein the first flow path is generally cylindrical and has a diameter and wherein the second flow path is generally cylindrical and has a diameter, the diameter of the first flow path being different than the diameter of the second flow path.

* * * * *